United States Patent
Robbins et al.

(10) Patent No.: US 11,979,489 B1
(45) Date of Patent: May 7, 2024

(54) DATABASE WITH ENCRYPTION KEY ROTATION

(71) Applicant: Amazon Technologies, Inc., Seattle, WA (US)

(72) Inventors: Edwin Robbins, Redmond, WA (US); Bala Murali Krishna Ummaneni, Bothell, WA (US); Carr James Onstott, Seattle, WA (US); Thomas Barton, Mukilteo, WA (US); John Richter, Seattle, WA (US); Rong Xiao, Langley (CA); Caroline Gordon, Seattle, WA (US); Shayna Weinstein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 17/741,292

(22) Filed: May 10, 2022

(51) Int. Cl.
*H04L 9/08* (2006.01)
*G06F 21/62* (2013.01)

(52) U.S. Cl.
CPC ........ *H04L 9/0822* (2013.01); *G06F 21/6218* (2013.01); *H04L 9/0833* (2013.01); *H04L 9/0891* (2013.01)

(58) Field of Classification Search
CPC ... H04L 9/0822; H04L 9/0833; H04L 9/0891; H04L 9/0825; H04L 9/08; G06F 21/6218; G06F 21/6227; G06F 21/6272
See application file for complete search history.

(56) References Cited

U.S. PATENT DOCUMENTS

| 2011/0075847 | A1* | 3/2011 | Rossi | H04N 21/4623 380/279 |
| 2014/0181514 | A1* | 6/2014 | Aoyagi | H04L 63/08 713/168 |
| 2018/0091489 | A1* | 3/2018 | Biggs | H04L 51/04 |

* cited by examiner

*Primary Examiner* — Quazi Farooqui
(74) *Attorney, Agent, or Firm* — Davis Wright Tremaine LLP

(57) ABSTRACT

A database stores a document as a plurality of encrypted records, where each record is indicative of an incremental change to the state of the document, and encrypted using a document key. The document key is stored with encryption decryptable using a group key, and the group key is stored with encryption decryptable using a first access key. In response to a request to rotate from the first access key to a second access key, the database decrypts the group key using the first access key, a stores a group key re-encrypted with the second access key.

20 Claims, 10 Drawing Sheets

US 11,979,489 B1

DATABASE WITH ENCRYPTION KEY ROTATION

BACKGROUND

Databases employing ledger-based or log-structured storage are becoming increasingly popular. They are often capable of providing a wide variety of benefits, potentially including benefits such as improved performance, reliability, and verifiability.

At the same time, data security has become increasingly important. One approach to data security involves storing data in encrypted form. However, providing support for encryption when using databases with ledger-based or log-based storage may often present a number of challenges.

BRIEF DESCRIPTION OF THE DRAWINGS

Various techniques will be described with reference to the drawings, in which.

DETAILED DESCRIPTION

Figure 1:
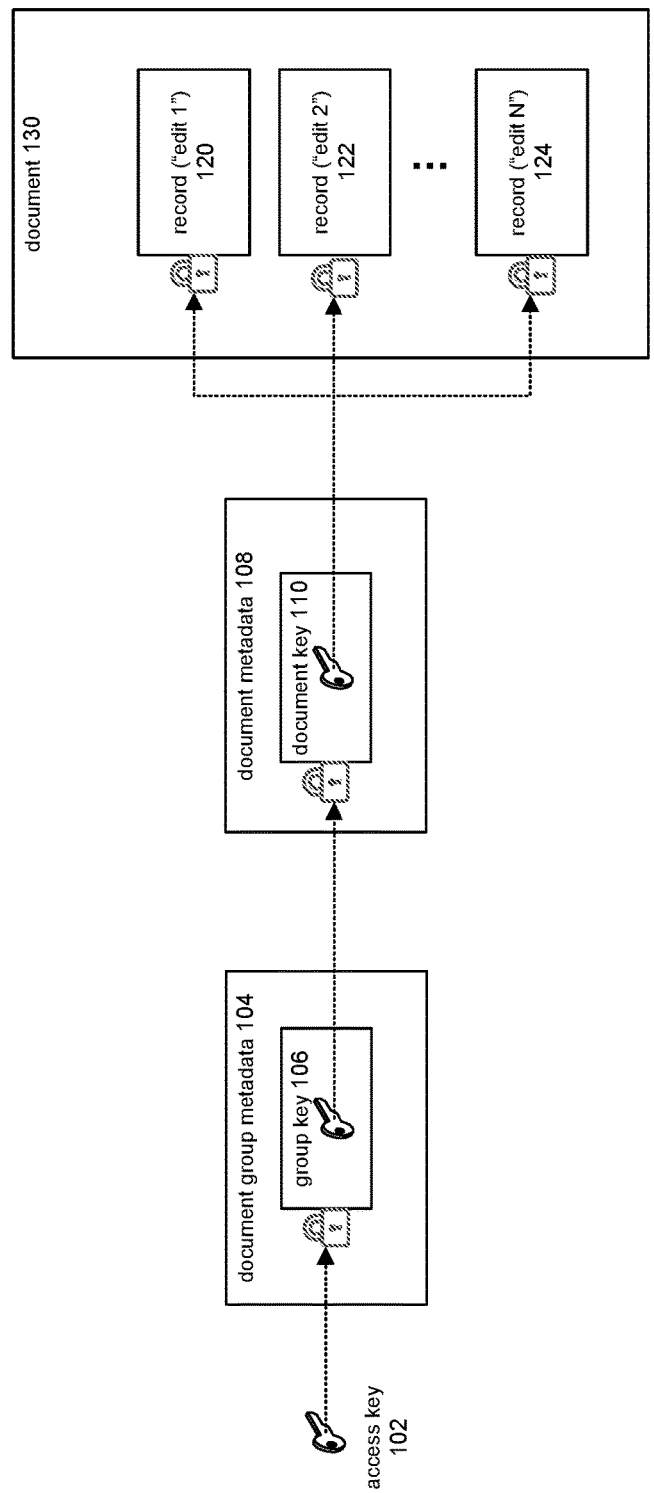
FIG. 1 illustrates a ledger-based database system comprising support for client-controlled document encryption, in accordance with at least one embodiment.

In an example, a ledger-based database system stores documents as series of records, where the records each describe incremental changes to the state of a document. The ledger-based database further supports encrypting these records, so that access to the records cannot be obtained without using an appropriate cryptographic key. Moreover, the example ledger-based database system provides support for client-managed access keys. A client-managed access key is a cryptographic key whose use is authorized by the client, including the ability to grant or revoke authorization.

When client-managed access keys are used, the client may at times wish to rotate keys. Key rotations refers to transitioning from the use of a first key to a second key. For example, the database may initially be configured to use a first client-managed access key. During this time, the records in the database are encrypted using a chain of encryption keys that can only be unencrypted while the database is authorized to use this first client-managed access key. The client may then request that the database transition to the use of a second client-managed access key. After performing key rotation, the database is no longer able to access the client's encrypted records using the first key, but is able to access the records using the second key.

In this example, efficient key rotation in a ledger-based database is achieved using the aforementioned chain of encryption. In particular, each document record (corresponding to the data that makes up the document's current state) is encrypted using a document key, and the document is associated with a document group. Document metadata, at least including the document key, is encrypted using a group key. Metadata for the group, including the group key, can be encrypted using a client-managed access key. By retaining only the encrypted copies of the document and group keys, the database is able to access the document only while it has access to the client-managed access key. To rotate to a new client-managed key, the database decrypts the group metadata, including the group key, using the prior client-managed key, and then re-encrypts the group metadata, including the group key, using the new client-managed key. Any plaintext versions of the group key, or copies of the group key encrypted using the old key, are redacted. The database is then able to access the document only using the new client-managed key. The rotation is accomplished as an atomic operation, which either wholly succeeds or wholly fails, and is accomplished without decrypting or re-encrypting any of the document records. These factors improve the reliability and efficiency of the key rotations.

In a further aspect of the example, the database is configured to use default access keys and default document groups when the client has not requested that a client-managed key be used. The client can subsequently rotate from the default configuration to one that uses a client-managed key. This process is similar to the one just described, but may also include switching document groups. For example, In at least one embodiment, rotation from a default access key to a client-managed access key is performed by first decrypting the group metadata and default group key with the default access key, and decrypting the document metadata and document key with the decrypted group key. The database then creates a new group for the document, encrypts the document metadata and document key using the new group key, and encrypts the new group metadata and group key using the client-managed access key.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a ledger-based database system comprising support for client-controlled document encryption, in accordance with at least one embodiment.

In the example 100 of FIG. 1, a leger-based database stores a collection of documents. As used herein, a document can refer to any of a variety of data types. Examples of documents include, but are not necessarily limited to, textual or binary data files, textual or binary blobs, rows of a table, collections of key-value pairs, entity data, and object data. Documents may also be described as database items, database objects, database rows, entities, and so forth.

In the example of FIG. 1, the database stores each document as a series of records, each of which indicates a change to the state, or contents, of the document. The records are temporally ordered, and allow for the state of the object at a given time to be reconstructed by following the recorded chain of incremental changes. For example, a document 130 may be stored by the database as an ordered set of records 120-124, each representing a successive edit ("edit 1," "edit 2," . . . "edit N") to the document. Examples of edits to a document can include, but are not necessarily limited to, adding a new document, appending data to the document, modifying data in the document, deleting data from the document, and deleting the document.

The ledger-based database, which may also be referred to as log-based, stores documents as a series of records. Each record is indicative of a change to a document may be treated by the system as immutable. In at least one embodiment, cryptographic data is recorded to assist in verifying that no entry associated with a document has been tampered with. For example, each of the records 120-124 may contain a cryptographic hash based on its contents and a hash of a prior entry. It will be appreciated that this example is intended to be illustrative rather than limiting, and should not be construed in a manner that would limit the scope of the present disclosure to only those embodiments that conform to the specific example provided.

The records 120-124 of the document 130 may also be encrypted using symmetric or asymmetric encryption. Encryption may provide various advantages, including but not necessarily limited to restricting access to the corresponding document 130. Note that the records 120-124 may be individually encrypted and stored separately, which can also convey advantages in some embodiments, such as advantages related to efficient use of storage or memory. However, re-encrypting the records associated with documents could be computationally expensive, resource-intensive, or time-consuming, particularly for those documents that have many records.

The database, in various embodiments, provides client with capabilities for controlling keys used in relation to document encryption. In one example, a client obtains one or more keys for encryption and decryption from a cryptographic services provider, and authorizes the database to access to the keys. These keys can then be used by the database in relation to the encryption of records 120-124 for document 130. However, the client may subsequently determine to revoke access to the keys, and replace them with a new set of one or more keys. This may be referred to as key rotation. Excessive computational costs could be incurred if, to perform key rotation, each of the records 120-124 of a document 130 were decrypted using an old key and re-encrypted using a new key, particularly for documents that have undergone large numbers of edits and have a correspondingly large number of associated records, or for clients who store many documents. In at least one embodiment, the technique illustrated in FIG. 1 is used, instead of directly encrypting records 120-124 with a client-managed key. As depicted by FIG. 1, the records of document 130 are encrypted using encryption that is decryptable using a document key 110. The document key 110 may be included in document metadata 108 that is encrypted using encryption decryptable by a group key 106. This group key 106 may be included in document group metadata 104. The document group metadata 104 can, in turn, be encrypted using decryption that is decryptable by an access key 102. The access key 102 may be client-managed.

The database, in order to access encrypted records, can obtain the current access key 102, obtain the group key 106 by decrypting the document group metadata 104 using the access key 102, obtain the document key 110 by decrypting the document metadata using the group key 106, and access the records 120-124 by decryption using the document key 110.

In at least one embodiment, when a client-managed access key 102 is rotated to a new key, the document group metadata 104 is accessed, along with the group key 106, by using the old access key 102 a final time. References to the old access key 102 are then redacted. The database then re-encrypts the document group metadata 104 using the new access key, and stores the re-encrypted document group metadata 104. The database can then access data in document 130 using the same process explained previously. In this manner, the key rotation is handled without requiring any of the records 120-124 to be decrypted and re-encrypted.

Figure 2:
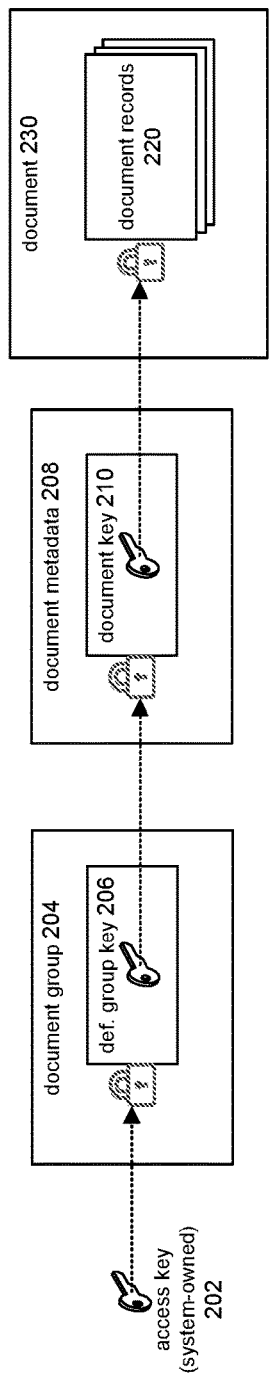
FIG. 2 illustrates an example of managing default access and group keys in a ledger-based database, in accordance with at least one embodiment.

FIG. 2 illustrates an example of managing default access and group keys in a ledger-based database, in accordance with at least one embodiment. In the example 100 of FIG. 1, a ledger-based database included support for a client-managed access key 102. It may be advantageous, however, to support client-managed access keys while also providing for a default case in which no such key has been provided. This might be advantageous, for example, when a client first creates a database and has not yet determined whether or not to utilize a client-managed key. It might also be advantageous when the ledger-based database is multi-tenant, and some of its clients utilize client-managed access keys and other clients do not.

As depicted in the example 200, document records 220 for a document 230 are stored encrypted, using encryption that is decryptable using a document key 210. In at least one embodiment, each document is stored using a different document key. The document key 210 can be automatically generated by the database. The document key 210 can then be included in document metadata 208 and stored using encryption decryptable by a default group key 206. This key can, in turn, be included in metadata associated with a default document group 204 and stored using encryption decryptable by a default, or system-owned, access key 202. The default access key 202 can be automatically generated and stored by the database system. As used here, default refers to the key being managed by the system, as opposed to being provided by a client. The database may, for example, automatically and generate and store a default access key 202 on behalf of each client.

Figure 3:
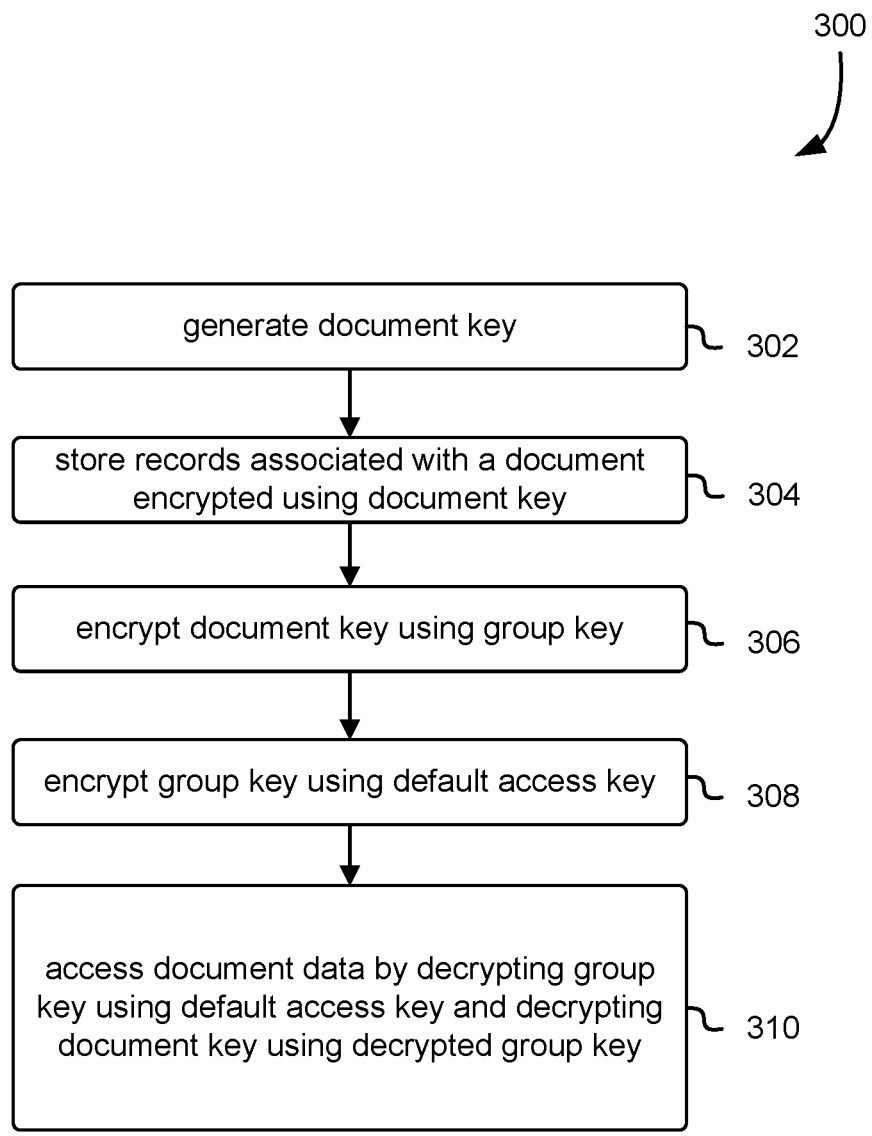
FIG. 3 illustrates an example process for operating a ledger-based database using a default access key, in accordance with at least one embodiment.

This process can be further understood in view of FIG. 3, which illustrates an example process for operating a ledger-based database using a default access key, in accordance with at least one embodiment. Although the example procedure 300 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 300 is implemented by a ledger-based database system, such as the one depicted in relation to FIG. 10.

At 302, the database generates a document key. In at least one embodiment, this is done on a per-document basis, so that each record is encrypted with a unique document key.

At 304, the database stores records, associated with a document, that has been encrypted using the generated document key. In the case of asymmetric encryption, the term key may refer to the appropriate portion of an asymmetric key pair, depending on whether the key is being used for encryption or decryption. The records, in at least one embodiment, are of incremental changes to the document, as described herein and depicted in at least FIGS. 1 and 8. In at least one embodiment, each record is individually encrypted using the generated document key. Note that as additional changes to a document are processed, the database will continue to store additional records, using encryption that is decryptable with the generated document key. This is done, in part, by accessing the document data in accordance with the operations described in relation to element 310.

At 306, the database encrypts the document key using a group key. The encrypted document key is then stored. In at least one embodiment, any unencrypted copies of the document key are redacted (e.g., erased from memory), so that the document's records cannot be accessed without first decrypting the encrypted copy of the document key, using a group key.

At 308, the database encrypts the group key using a default access key. The encrypted group key is then stored. In at least one embodiment, any unencrypted copies of the group key are redacted, so that neither the group key nor the document key can be accessed without access to the default access key.

At 310, the database accesses document data by decrypting the group key using the default access key, and decrypting the document key using the decrypted group key. As used herein, accessing the document, or the document's records, includes reading records of incremental changes to the document, or writing additional records of incremental changes. In the case of reading the records, the state of a document can be determined once the document key is unencrypted. For example, in at least one embodiment, the current state of the document is determined by using the document key to decrypt document records and identify the series of incremental changes that, in sum, define the document's current state. In the case of writes, including inserts, updates, or deletions, the unencrypted document key is used to encrypt one or more additional records that can then be appended to the ledger.

Figure 4:
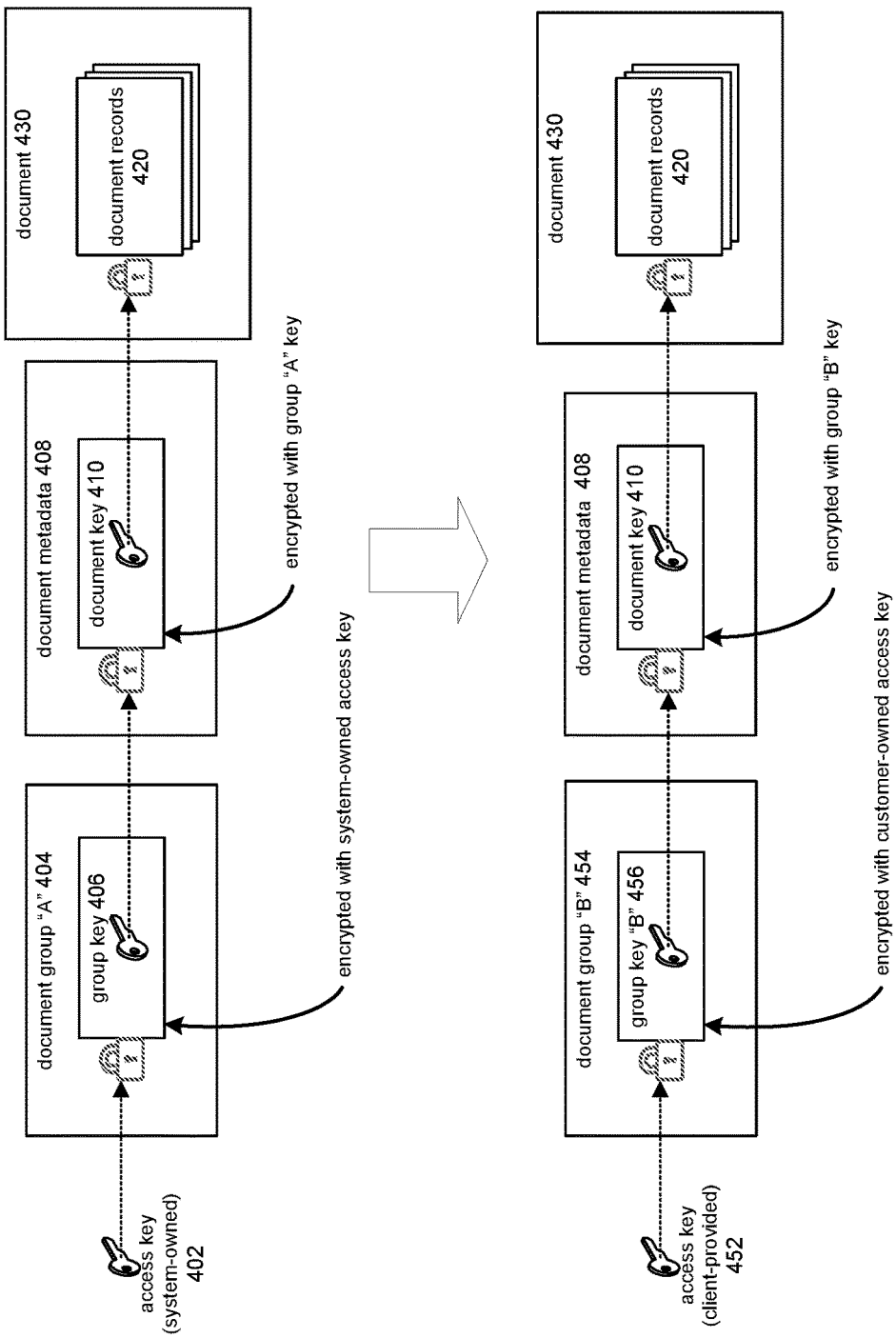
FIG. 4 illustrates an example of rotating from a default access key to a client-managed access key, in accordance with at least one embodiment.

FIG. 4 illustrates an example of rotating from a default access key to a client-provided, or client managed, access key, in accordance with at least one embodiment. In the example 400 of FIG. 4, it is assumed that a ledger-based database has stored a document 430 that is stored as a plurality of encrypted document records 420, each of which represents an incremental change to the contents or status of the document 430. The document records are encrypted by a document key 410.

In at least one embodiment, the database stores document 430 and its associated document records 420 without using a customer-provided key, as described above in relation to FIGS. 2 and 3. Accordingly, a system-owned access key 402 may be used to encrypt a group key 406 associated with a document group 404 (designated group "A"), and the group key 406 used to encrypt the document key 410 associated with document metadata 408. The document records 420, and therefore the document 430, cannot be accessed at this stage without using the system-owned access key 402 to decrypt the group key 406, and using the decrypted group key 406 to decrypt the document key 410.

In at least one embodiment, the document group 404 is a default document group used with documents whose corresponding client(s) have not provided an access key. In some cases, the database will create a default document group for each client, and assign documents to that group when the client has not provided an access key.

In at least one embodiment, to transition to a client-managed, or client-provided access key 452, the database uses the current system-owned access key 402 to decrypt the current document group 404 and its group key 406, and then uses this group key 406 to decrypt the document key 410. The database then creates a new document group 454 and corresponding group key 456, and encrypts the document key 410 using the new group key 456. The new group key 456 is then encrypted, by the database, using the client-managed access key 452. The database may then redact any references to the unencrypted document key 410 and group key 456, so that the document 430 can be accessed only by using the client-managed access key 452.

Figure 5:
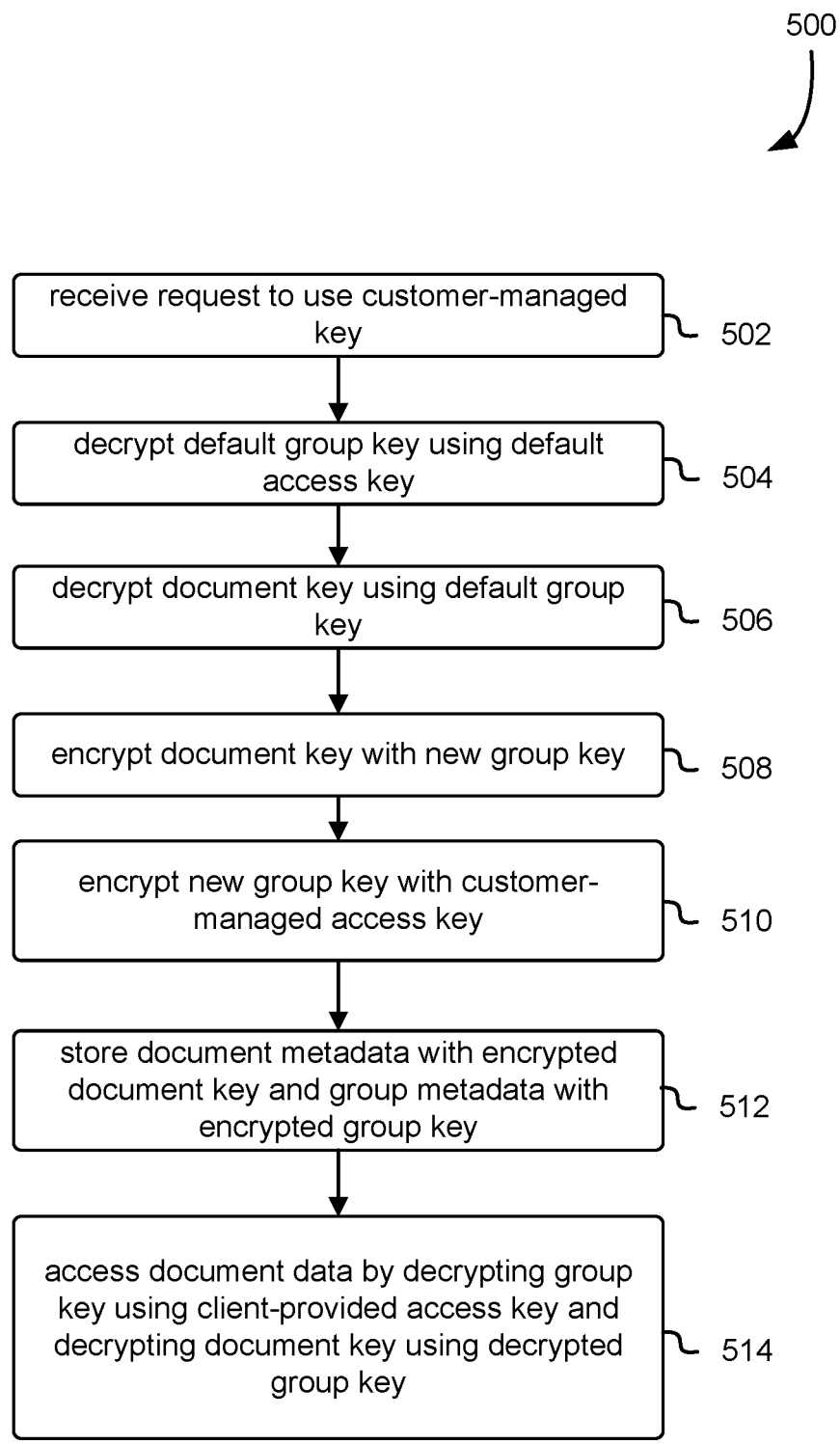
FIG. 5 illustrates an example process for rotating from a default access key to a client-managed access key, and for operating the ledger-based database after the rotation, in accordance with at least one embodiment.

This process may be further understood in view of FIG. 5, which illustrates an example process for rotating from a default access key to a client-managed access key, and for operating the ledger-based database after the rotation, in accordance with at least one embodiment. Although the example procedure 500 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 500 is implemented by a ledger-based database system, such as the one depicted in relation to FIG. 10.

At 502, the database receives a request to use a customer-managed key. The request may, in various embodiments, comprise one or more of the key, an identifier of the key, or information usable to authorize access to the key.

At 504, the database decrypts a default group key using a default access key. This results in the database having an ephemeral plaintext version of the group key, held in memory while needed for decryption. The stored version of the key may be kept in encrypted form.

At 506, the database decrypts a document key using the decrypted default group key. This results in the database having an ephemeral plaintext version of the document key, held in memory. The stored version of this key can be kept in encrypted form.

At 508, the database encrypts the document key using a new group key. The database may then redact versions of document key, which can include any durably stored versions as well as, in some cases, any plaintext versions.

At 510, the database encrypts the new group key using the customer-managed access key. The plaintext version of the new group key can then be redacted. Then, at 512, the database stores document metadata including the encrypted document key and stores group metadata including the encrypted group key. In at least one embodiment, the document and group metadata is stored in a key-value database. Any pre-existing document or group metadata, for the same document and group, is overwritten. The database may overwrite data by, for example, replacing previously stored data with new data. For data stored in a key-value store, this can be done by performing a put or set operation using the same key. Once the data is overwritten, the document key cannot be accessed without first decrypting the group key, and the group key cannot be decrypted without use of the new access key.

At 514, the database accesses the document by decrypting the group key using the client-managed access key, and decrypting the document key using the decrypted group key. The document key is then used, by the database, to access document records or to encrypt new document records.

Figure 6:
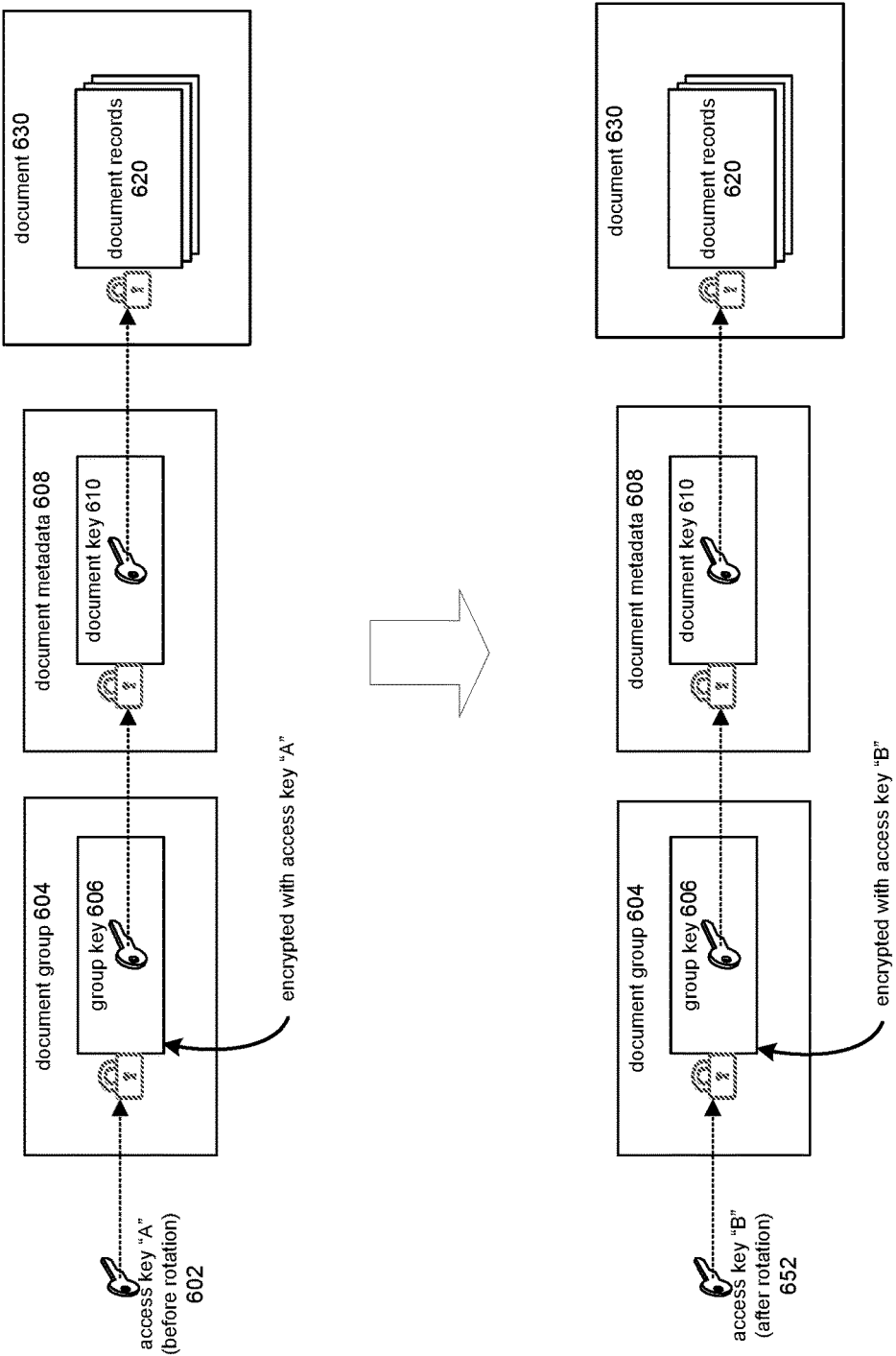
FIG. 6 illustrates an example of rotating from a first client-managed access key to a second client-managed access key, in accordance with at least one embodiment.

FIG. 6 illustrates an example of rotating from a first client-managed access key to a second client-managed access key, in accordance with at least one embodiment. In the example 600, a document 630 is stored as one or more document records 620. The document records 620 are encrypted using encryption that is decryptable using a document key 610. The document key 610 may be included in document metadata 608. The database encrypts the document key 610 using encryption that is decryptable using the group key 606, and encrypts the group key 606 using the client-managed access key 602. The group key 606 may be included in the document group 604.

To rotate from the initial client-managed access key 602 to a new client-managed access key 652, The encrypted group key 606 can be unencrypted using the prior client-managed access key 602, and then re-encrypted using the newly provided access key 652. Any copies of the prior access key 602, and any unencrypted copies of the group key 606, can be erased or redacted, to ensure that the document 630 can only be accessed by using the new client provided access key 652.

Figure 7:
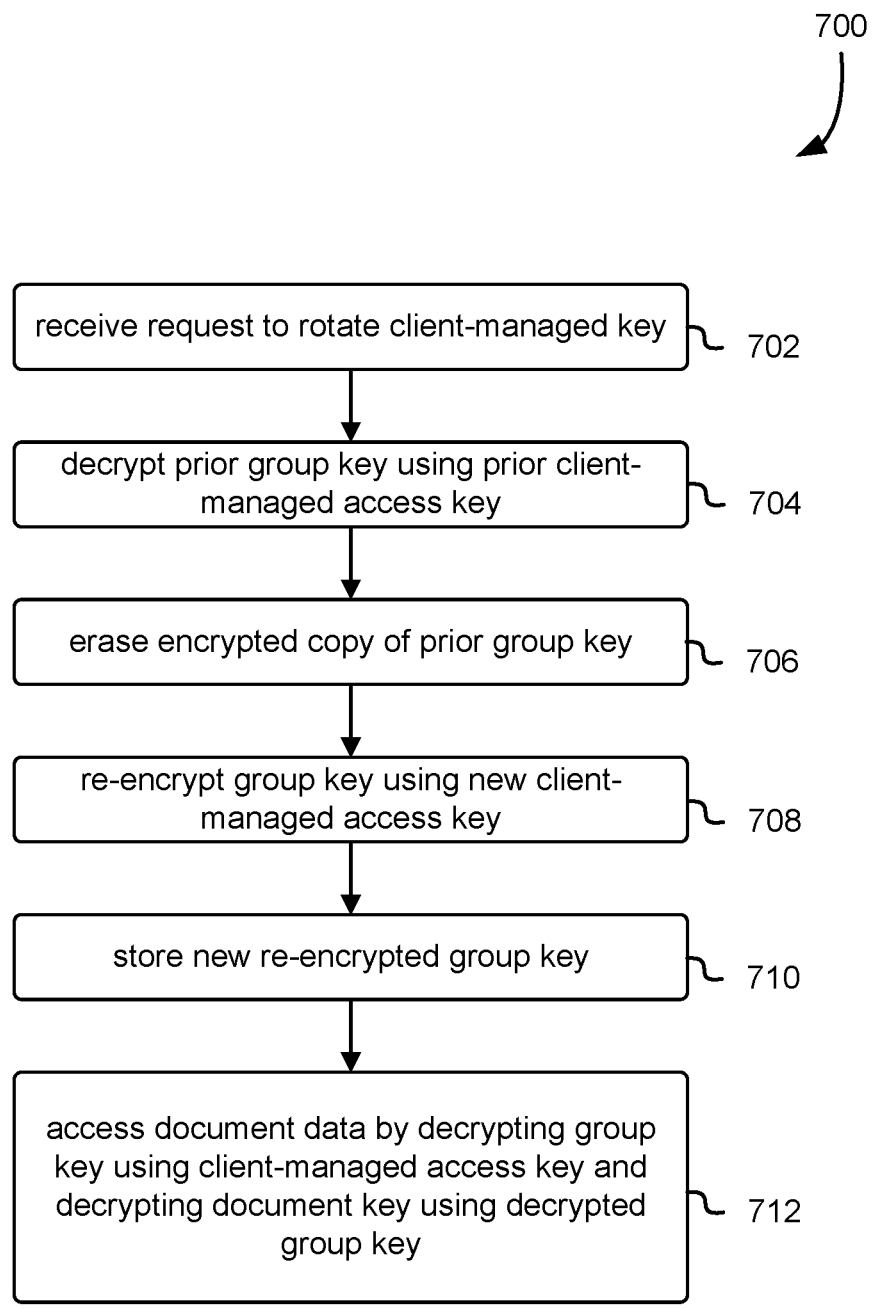
FIG. 7 illustrates an example process for rotating client-managed access keys, and for operating the ledger-based database after the rotation, in accordance with at least one embodiment.

This process may be further understood in view of FIG. 7, which illustrates an example process for rotating client-managed access keys, and for operating the ledger-based database after the rotation, in accordance with at least one embodiment. Although the example procedure 700 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 700 is implemented by a ledger-based database system, such as the one depicted in relation to FIG. 10.

At 702, the database receives a request to rotate a client-managed key. In the example of FIG. 7, this refers to switching from a prior client-managed key to a new managed key, and includes de-authorizing use of the prior client-managed key once the rotation is complete. The request further conveys that the database should, once the rotation is complete, be unable to access the client's encrypted data without using the new managed key.

At 704, the database decrypts the group key using the prior version of the client-managed access key. This results in the database storing a plaintext version of the group key. Then, at 706, the database erases any stored copies it has of the encrypted prior group key.

At 708, the database re-encrypts the group key using the new client-managed access key.

At 710, the database stores the re-encrypted group key. The re-encrypted group key may be stored with the group's metadata. For example, in at least one embodiment, the group metadata, with the re-encrypted group key, is written to a key-value data store, replacing the previously stored group metadata.

At 712, the database accesses data by decrypting the group key using the new client-managed access key and then decrypting the document key using the decrypted group key. Once the unencrypted document key is obtained, the database can read a document by decrypting the document records, or edit the record by appending new document records to the ledger.

Figure 8:
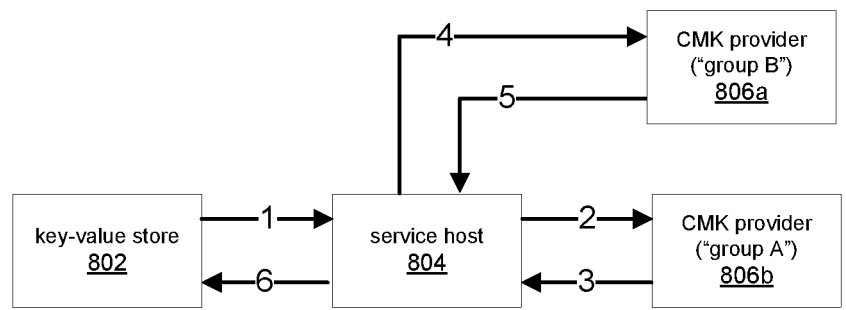
FIG. 8 illustrates an example system for reassigning a document to a different document group, in accordance with at least one embodiment.

FIG. 8 illustrates an example system for reassigning a document to a different document group, in accordance with at least one embodiment. The example 800 of FIG. 8 depicts a database system comprising a key-value store 802, service host 804, and one or more client-managed key providers 806*a-b*.

In at least one embodiment, a database component is implemented on service host 804. The service host 804 comprises one or more computing devices, each containing at least one processor and a memory that stores instructions for execution by the respective at least one processor. The instructions cause the database to perform various steps and operations, as described herein, to utilize client-managed keys in relation to the operation of the database.

In at least one embodiment, the key-value store 802 is a non-relational database that stores and retrieves data based on keys. Note, however, that a variety of data stores or data storage services, including any of a variety of relational or non-relational databases, might be used in place of the key-value store 802. The key-value data store comprises one or more computing devices, each containing at least one processor and a memory that stores instructions for execution by the respective at least one processor. The instructions cause the key-value data store to perform the various steps and operations attributed to it herein.

In at least one embodiment, the CMK providers 806*a-b* are cryptographic service providers that can create, manage, revoke, and authorize the use of cryptographic keys, as well as other various services related to encrypting or decrypting data. The CMK providers 806*a-b* comprise one or more computing devices, each containing at least one processor and a memory that stores instructions for execution by the respective at least one processor. The instructions cause the CMK provider to perform the various steps and operations attributed to it herein.

In the example 800, a document is reassigned from a document group "A" to a different document group "B." This might occur, for example, when a client requests that document storage be transitioned from using a default access key to using a client-managed access key.

In the example 800, it is assumed that an example document has a series of underlying edits that have been encrypted with the document's document key. The edits are only decryptable and readable if this document key is accessible to the database. The document key is stored encrypted, using the group key of the current document group. In this example, the initial document group is designated as group "A." The group key is, in turn, encrypted using the current access key. The access key transitively controls access to the document, as it is required in order complete the chain of decryption needed to decrypt the document. Note that if access to the current key were revoked, the document would no longer be accessible due to this transitive property.

In the example 800, it is assumed that symmetric encryption is used. A similar example, using asymmetric encryption, is provided below.

As depicted in FIG. 8, the process of reassigning a document to a different document group can invoke the depicted steps, numbered one through size. Note, however, that the depicted order should not be viewed as limiting the scope of potential embodiments to only those embodiments that conform to the specific example provided. Embodiments may, for example, omit or reorder certain steps, except where logically required, such as when the input to a step depends upon the output from another.

At step 1, the service host 804 obtains metadata for the document and the document groups from the key-value data store. This data may be read from the key-value store 802 and stored in the memory of the service host 804.

At step 2, a decrypt call is made to the CMK provider 806b for group "A." As noted above, group "A" is presumed, for the purposes of the example, to be the document group to which the document is initially assigned.

At step 3, the plaintext group key for group "A" is returned from the CMK provider 806b. The service host 804 then uses this group key to decrypt the document key, and store the plaintext document key in its memory.

At step 4, the service host 804 makes a decrypt call to the CMK provider 806a for group "B." Note that this may, in some cases, be the same provider 806b as is used for group "A," but they could be separate.

At step 5, the decrypted plaintext group key for group "B" is returned to the service host 804, and the plaintext of this group key is stored in the host's memory.

At step 6, the group key for group "B" is used to encrypt the document key, and the document metadata row is written back to persistent storage in the key-value data store 802. The prior entry in the key-value store 802 is overwritten, and the in-memory copies of plaintext keys are erased. As a result, the only remaining copy of the document key will encrypted using the group key from group "B" and stored in the key-value store 802.

When asymmetric encryption is used for the group key, a similar approach may be taken. The sequence of steps or operations may be simplified, as access to the CMK provider for group "B" can be eliminated, in lieu of storing a public key for the group "B" group key, and using this public key for the re-encryption of the document key.

Accordingly, when asymmetric encryption is used, the steps can proceed as follows. First, the document group and document metadata are obtained from the key-value store 802, and stored in the memory of the service host 804. Second, a decrypt call is make to the CMK provider for group "A" 806b, to decrypt the encrypted document group key. In this step, a private key is used. Third, the plaintext private key for the document group "A" is used to decrypt the document key. The resulting plaintext private key is stored in the service host's 804 memory. Finally, the document key is re-encrypted using the public key of document group "B," and stored back to the key-value store 802. As before, the prior entries for the document metadata is overwritten, so that the only copy of the document key is in persistent storage under control of the new document group "B."

As one skilled in the art will appreciate in light of this disclosure, certain embodiments may be capable of achieving certain advantages, including one or more of 1) supporting key rotation without requiring re-encryption of document records, resulting in improved database performance; 2) allowing for an atomic key rotations operation, resulting in greater database reliability, and 3) allowing for operation in cases where no client-provided key is available, providing for greater operational flexibility.

Figure 9:
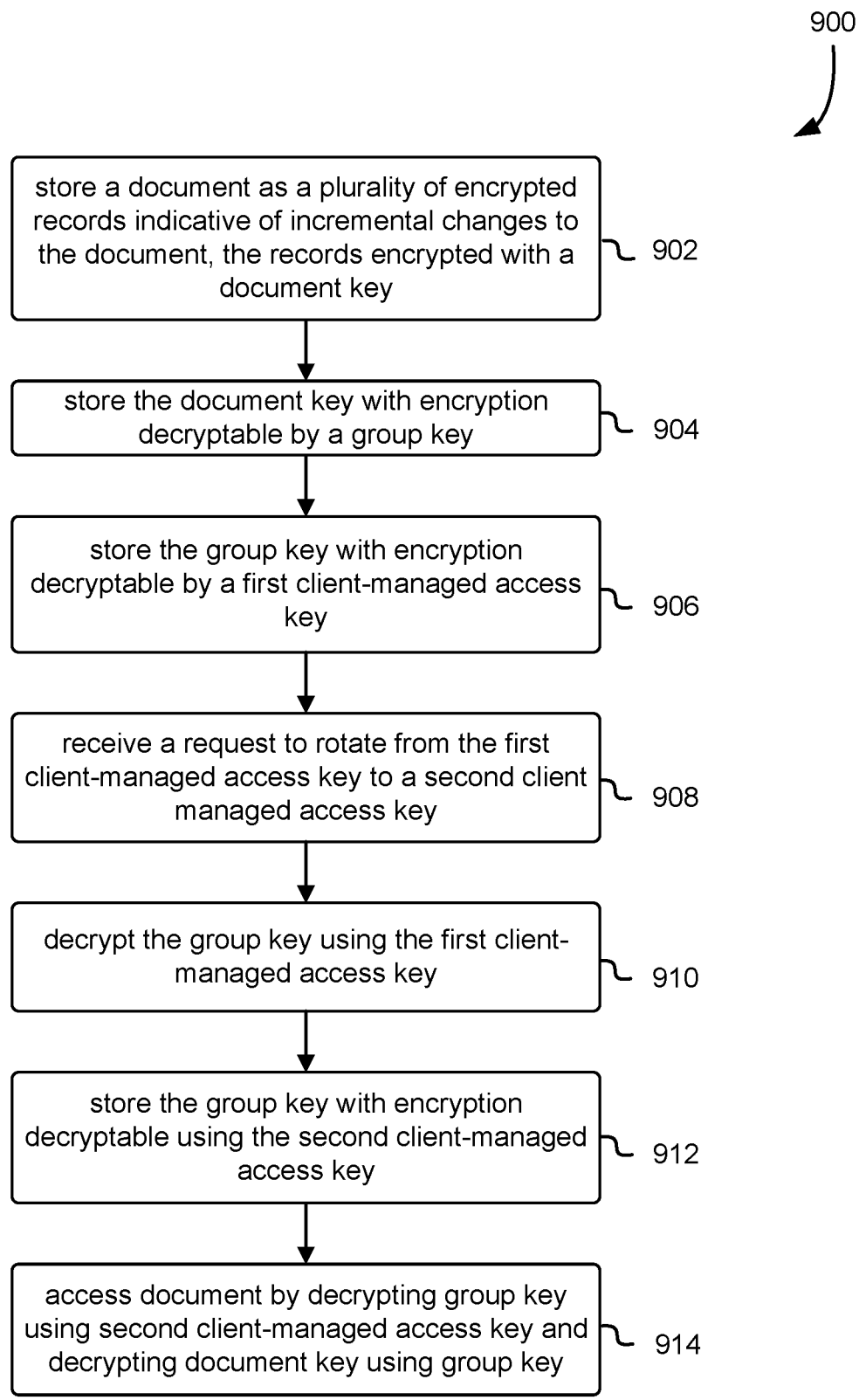
FIG. 9 illustrates an example process for operating a ledger-based database, in accordance with at least one embodiment.

FIG. 9 illustrates an example process for operating a ledger-based database, in accordance with at least one embodiment. Although the example procedure 900 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another. In at least one embodiment, the example procedure 700 is implemented by a ledger-based database system, such as the one depicted in relation to FIG. 10.

At 902, the database stores a document as a plurality of encrypted records indicative of incremental changes to the document, the records encrypted with a document key.

At 904, the database stores the document key in encrypted form, with encryption decryptable by a group key.

At 906, the database stores the group key, in encrypted form, with encryption decryptable by a first client-managed access key. At this stage, the database is able to access the document, whether for reading or writing, by using the first access key to decrypt the group key, and using the group key to decrypt the document key. To read the document, the database may, in at least one embodiment, use the document key to decrypt the plurality of encrypted records and scan the records to identify the documents current state. To write to the document, the database may, in at least one embodiment, append an encrypted record to the plurality of records, using the document key for the encryption.

At 908, the database receives a request to rotate from the first client-managed access key to a second client-managed access key. Here, rotation includes replacing the first client-managed access key with the second, and reconfiguring the database such that the document can no longer be accessed with the use of the second client-managed access key.

At 910, the database decrypts the group key using the first client-managed access key. As noted above, the database in this example previously stored an encrypted copy of the group key, using encryption decryptable using the first client-managed access key. This encrypted copy is stored, with other group metadata, in a data repository, such as a key-value data store. Accordingly, in at least one embodiment, the database retrieves the group metadata from the data store, and decrypts it using the first client-managed access key.

At 912, the database stores the group key with encryption decryptable using the second client-managed access key. For example, in at least one embodiment, the database encrypts the group key using the second client-managed access key, and stores the encrypted version of the group key, along with group metadata, in a data store, replacing the early version of the group key and group metadata. At this stage, the document key cannot be accessed without the group key, as before, and the group key cannot be accessed without the second client-managed access key.

At 914, the database access the document by decrypting group key using second client-managed access key and decrypting the document key using group key. To read the document, the database may, in at least one embodiment, use the document key to decrypt the plurality of encrypted records and scan the records to identify the documents current state. To write to the document, the database may, in at least one embodiment, append an encrypted record to the plurality of records, using the document key for the encryption. This procedure the same as it was prior to the key rotation, but requires the new client-managed access key.

In a further example, a method of operating a database comprises storing a database document as a plurality of encrypted records, where the plurality of encrypted records are decryptable using a document key, and each of the plurality of encrypted records is indicate of an incremental change to the state of the document.

The example method further comprises storing the document key with encryption decryptable using a group key.

The group key may be one associated with a default group, such as one used when the client has not authorized use of a client-managed access key, or with a non-default group.

The example method further comprises storing the group key with encryption decryptable using a first access key. In some aspects of the example method, plaintext copies of the group key are held only in volatile memory, temporarily, to ensure that the group key cannot be accessed without using the appropriate client-provided access key, which at this stage would be the first access key.

The example method further comprises, in response to a request to rotate the first access key to a second access key, decrypting the group key using the first access key and storing the group key with encryption decryptable with the second access key. Here, the request indicates that subsequent to the rotation, the database document cannot be accessed by the database without authorization to use the second client-managed access key. In at least one embodiment, this is done by ensuring that any plaintext copies of the group key are redacted, as well as any copies of the group key that were encrypted using the first access key. The example method may therefore further comprise overwriting any stored copies of data including stored, encrypted copies of the group key. In some cases, this may also include erasing or overwriting plaintext versions of the document key or group key, as well as any encrypted group or document keys that could be decrypted as part of a decryption chain that does not include the current access key. Note that plaintext versions of any key may be kept, in embodiments, only in volatile memory, and never stored in a persistent medium.

In the example method, an update to the document is processed by at least storing an additional encrypted record with the plurality of records. The encrypted record describes an incremental change to the state of the document, and is decryptable using the document key.

In the example method, certain cryptographic operations may be performed by a cryptographic services provider. For example, in at least one embodiment, the database sends a request to perform decryption using the first access key, prior to rotation, or the second access key subsequent to rotation.

In a further aspect of the example method, a default group is used when the client has not provided authorization to use a client-managed access key. For example, In at least one embodiment, the method comprises storing a default group key using encryption decryptable by a default access key, and storing an encrypted document key using decryption decryptable using the default group key.

In a further aspect of the example method, decrypted content of a database document become inaccessible to the database in response to revocation, by a client, of authorization to use the current access key. For example, a database system may utilize a third-party, external, or otherwise remote cryptographic services provider, through which it performs encryption and decryption operations using client-managed access keys. Although in some cases the client may rotate from one client-managed key to another, there may be circumstances in which revocation is preferable to the client. Revocation refers to the use of a key become unauthorized, and may involve preventing access to the revoked key. When a client revokes access to the current (in-use) key, the database becomes unable to access the contents of a document, since this content is stored in the encrypted database records that correspond to the document.

Figure 10:
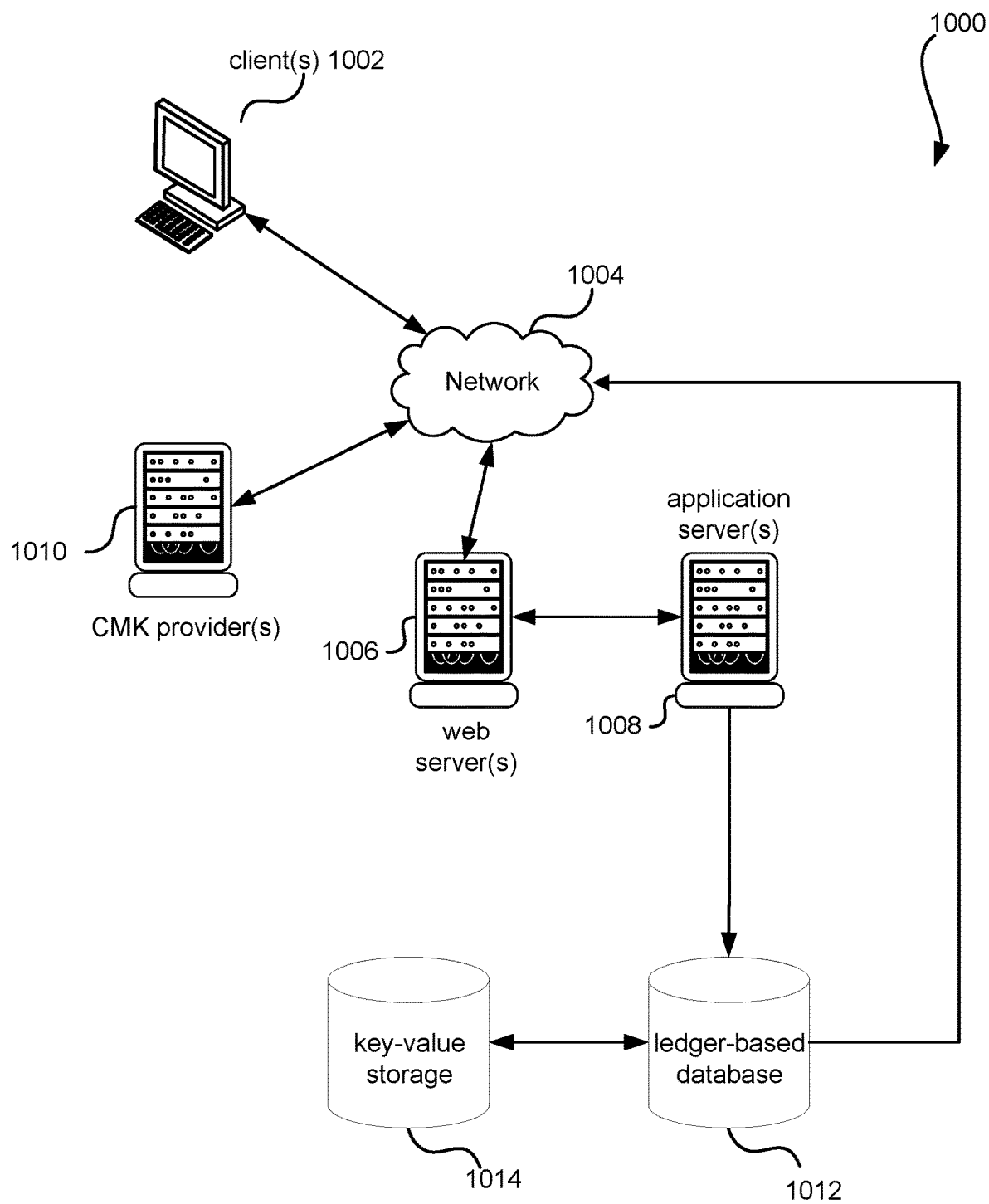
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and one or more databases, including a key-value storage 1014 and ledger-based database 1012, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of Hypertext Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The ledger-based database 1012, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data and user information, which are used to serve content for the production side. The data store also is shown to include a mechanism for storing log data, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the ledger-based database 1012.

The ledger-based database 1012, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

The key-value storage 1014 may, in various embodiments, perform one or more of the roles attributed to the ledger-based database 1012 just described. In at least one embodiment, the key-value storage 1014 works in conjunction with the ledger-based database 1012. For example, as described herein, the key-value storage 1014 may be used, in embodiments, to store document and group metadata. As described herein, the document metadata may contain encrypted document keys, and the group metadata may include encrypted group keys usable to decrypt the document keys.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In at least one embodiment, the system 1000 includes (or has access to) one or more client-managed key provider(s) ("CMKs") 1010. These may also sometimes be referred to as cryptographic service providers. These may be operated as a component of system 1000, or may be operated by third parties. In at least one embodiment, one or more of the CMK providers 1010 are remote to other components of the system, including remote to the web server(s) 1006, application server(s) 1008, and ledger-based database 1012.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory to store computer-executable instructions that, in response to execution by the one or more processors, cause the system to at least:
store a document as a plurality of encrypted records, each of the plurality of encrypted records indicative of at least one change to the document, the plurality of encrypted records decryptable using a document key;

store the document key with encryption decryptable using a group key;
store the group key with encryption decryptable using a first client-managed access key; and
respond to a request to rotate the first client-managed access key to a second client-managed access key by at least:
decrypting the group key using the first client-managed access key; and
storing the group key with encryption decryptable with the second client-managed access key.

2. The system of claim 1, the memory to store further computer-executable instructions that, in response to execution by the one or more processors, cause the system to at least:
decrypt the group key using the second client-managed access key;
decrypt the document key using the group key; and
decrypt one or more of the plurality of encrypted records using the document key.

3. The system of claim 1, the memory to store further computer-executable instructions that, in response to execution by the one or more processors, cause the system to at least:
send, to a remote cryptographic services provider, a request to decrypt a client-managed access key.

4. The system of claim 1, wherein, prior to receiving the first or second client-managed access keys, the document key is stored with encryption decryptable using a default group key, and stores the default group key with encryption decryptable using a default access key.

5. The system of claim 1, wherein rotation from the first client-managed access key to the second client-managed access key is accomplished without re-encryption of the plurality of encrypted records.

6. A method, comprising:
storing a database document as a plurality of encrypted records, the plurality of encrypted records decryptable using a document key;
storing the document key with encryption decryptable using a group key;
storing the group key with encryption decryptable using a first access key; and
in response to a request to rotate the first access key to a second access key, decrypting the group key using the first access key and storing the group key with encryption decryptable with the second access key.

7. The method of claim 6, wherein a record, of the plurality of encrypted records, comprises information indicative of an incremental change to the document.

8. The method of claim 6, further comprising:
processing an update to the document by at least storing an additional encrypted record, the encrypted record decryptable using the document key.

9. The method of claim 6, wherein subsequent to the rotation, the database document cannot be accessed by the database without authorization to use the second access key.

10. The method of claim 6, further comprising:
sending, to a remote cryptographic services provider, a request to use at least one of the first or second access keys to decrypt a group key.

11. The method of claim 6, further comprising:
storing a default group key using encryption decryptable by a default access key; and
storing an encrypted document key using encryption decryptable using the default group key.

12. The method of claim 6, further comprising:
storing the document key in metadata encrypted using the group key.

13. The method of claim 6, further comprising:
overwriting a stored copy of the group key in response to the request to rotate to the group key.

14. A non-transitory computer-readable storage medium storing thereon executable instructions that, as a result of being executed by one or more processors of a computer system, cause the computer system to at least:
store, in a database, a database item as a plurality of encrypted records, the plurality of encrypted records decryptable using a document key;
store the document key with encryption decryptable using a group key;
store the group key with encryption decryptable using a first access key; and
rotate the first access key to a second access key by at least decrypting the group key using the first access key and storing the group key with encryption decryptable with the second access key.

15. The non-transitory computer-readable storage medium of claim 14, wherein decrypted content of the database item becomes inaccessible to the database in response to revocation, by a client, of authorization to use the second access key.

16. The non-transitory computer-readable storage medium of claim 14, wherein one or more records are added to the plurality of records, the one or more records stored using encryption decryptable using the document key.

17. The non-transitory computer-readable storage medium of claim 14, wherein the instructions further comprise instructions that, as a result of being executed by the one or more processors, cause the computer system to at least:
decrypt the group key using the first access key;
decrypt the document key using the group key; and
decrypt one or more of the plurality of encrypted records using the document key.

18. The non-transitory computer-readable storage medium of claim 14, wherein the group key is decrypted using a remote cryptographic services provider.

19. The non-transitory computer-readable storage medium of claim 14, wherein the instructions further comprise instructions that, as a result of being executed by the one or more processors, cause the computer system to at least:
store a default group key using encryption decryptable by a default access key; and
store an encrypted document key using encryption decryptable using the default group key.

20. The non-transitory computer-readable storage medium of claim 14, wherein the instructions further comprise instructions that, as a result of being executed by the one or more processors, cause the computer system to at least:
overwrite a stored copy of the group key in response to a request to rotate to the second key.

* * * * *